Feb. 6, 1962 P. H. MORRISON ET AL 3,019,923
APPARATUS FOR SUPPORTING LAND WORKING OR
OTHER TOOLS ON A TRACTOR
Filed Aug. 27, 1959 5 Sheets-Sheet 1

INVENTORS
PERCIVAL H. MORRISON
PERCIVAL J. PACKMAN

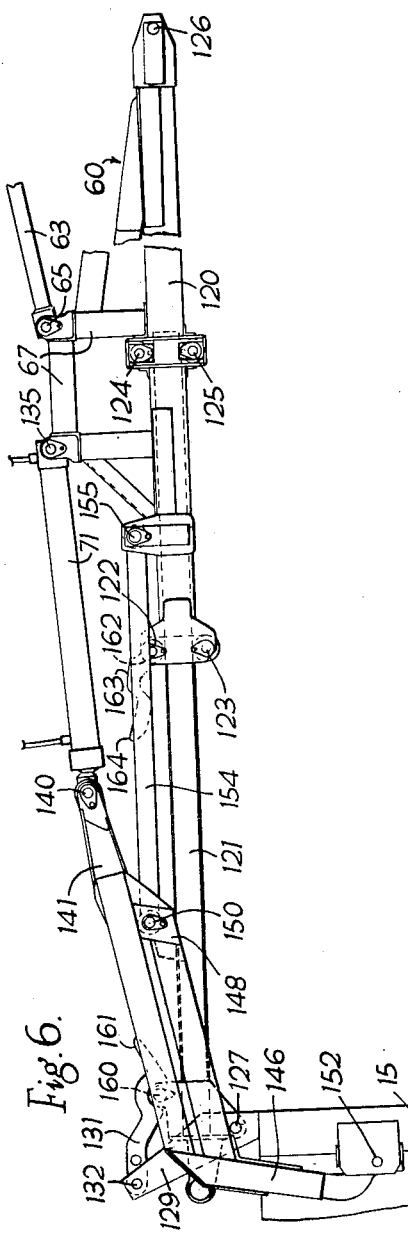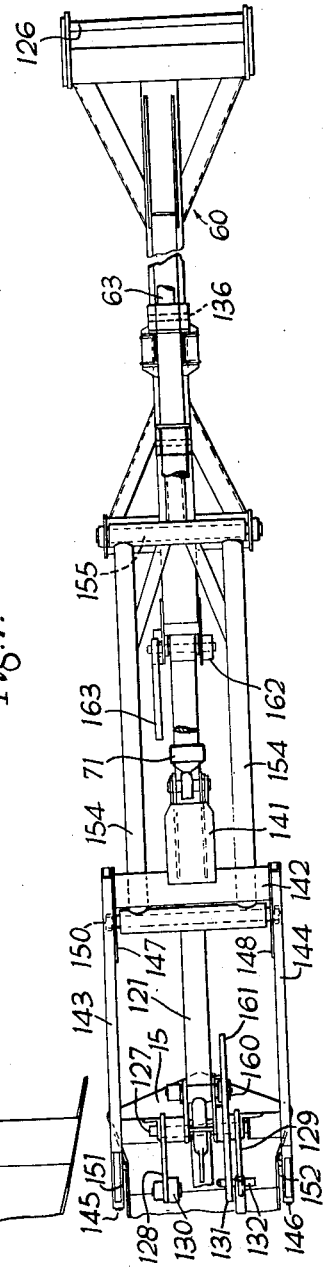

United States Patent Office 3,019,923
Patented Feb. 6, 1962

3,019,923
APPARATUS FOR SUPPORTING LAND WORKING OR OTHER TOOLS ON A TRACTOR
Percival H. Morrison, Twyford, and Percival J. Packman, Ruscombe, near Twyford, England, assignors to Leeford (London) Limited, London, England, a British company
Filed Aug. 27, 1959, Ser. No. 836,453
Claims priority, application Great Britain Aug. 29, 1958
4 Claims. (Cl. 214—140)

This invention relates to apparatus to be mounted on a tractor for supporting land working or other tools or implements, and its main object is to enable the tool to be located and operated in a manner convenient to the driver and leading to speedy work and in particular to provide such a supporting means as will enable the tool or implement that is mounted on it to be moved bodily in suitable directions in relation to the tractor whereby, for example, the operation of trenching or ditching may be effected without having to use the usual sluing boom for discharging the bucket, and without constantly changing the direction of the tractor.

According to the present invention the apparatus comprises a beam having means for attaching the same to and for support by the tractor transversely across the tractor at its rear end, said beam extending to a position at one side of the tractor, a carriage mounted on and for relative movement along the beam, means on said carriage for the detachable attachment and support of the tool, and means for moving the carriage longitudinally along the beam. If desired, the beam may be arranged to extend selectively on either side of the tractor.

A constructional form of the invention will now be described by way of example with reference to the accompanying diagrammatic drawings wherein:

FIGURE 6 is a view in greater detail of part of the ditch digging tool shown in FIGURE 2;

FIGURE 7 is a plan view of the parts shown in FIGURE 6; and

Figure 1:
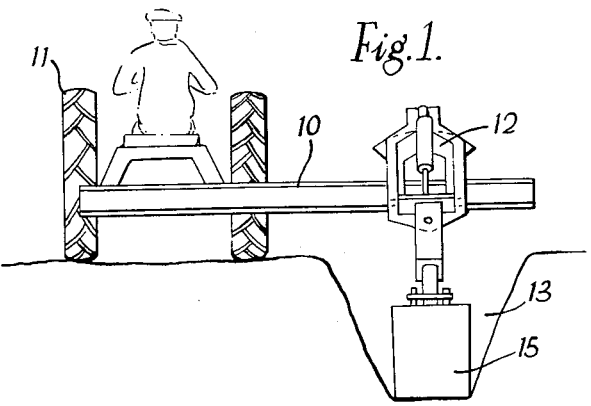
FIGURE 1 is a rear view of a tractor provided with apparatus made in accordance with the invention.

As shown in FIGURE 1 a beam 10 is fixed to the tractor 11 above ground level with a part directly across the rear of the tractor and with a portion thereof extending to one side of the tractor. A carriage 12 is mounted for movement along the beam 10 so that it can be disposed directly behind the tractor or can be located to either side of the tractor whereby the tractor can be driven along the side of a ditch 13 and ditching, digging or like operations can be effected by means of a bucket or other tool 15 mounted on the carriage and operable by control means disposed in a position convenient to the driver.

The beam is carried by a pair of brackets 16, 17 (FIGURE 2) welded thereto. These brackets are fixed to a rigid frame 18. Arms 20, 21 are pivoted at 22, 23 to the frame 18 and extend forwardly thereof and cross-members 24 connect the arms to form a pivoted framework. The forward ends of the arms are formed with apertured ears 26, 27 whereby they can be pivotally mounted on the back axle of the tractor. The frame 18 has laterally projecting pivot pins 28 on which arms 30, 31 are pivotally mounted. The arms 30, 31 (which are normally provided on the tractor) extend forwardly and their front ends are attached to the power lifting means of the tractor whereby the frame 18, beam 10, and tool 15 can be raised and lowered by pivotal movement on the axis of the lugs 26, 27. The frame 18 is detachable from the arms 30, 31.

Skid plates 33, 34 are welded to the beam 10 and to legs 35 that are fixed to the brackets 16, 17 and serve to support the weight of the beam and parts carried thereby on the ground during operation of the tool.

Figure 2:
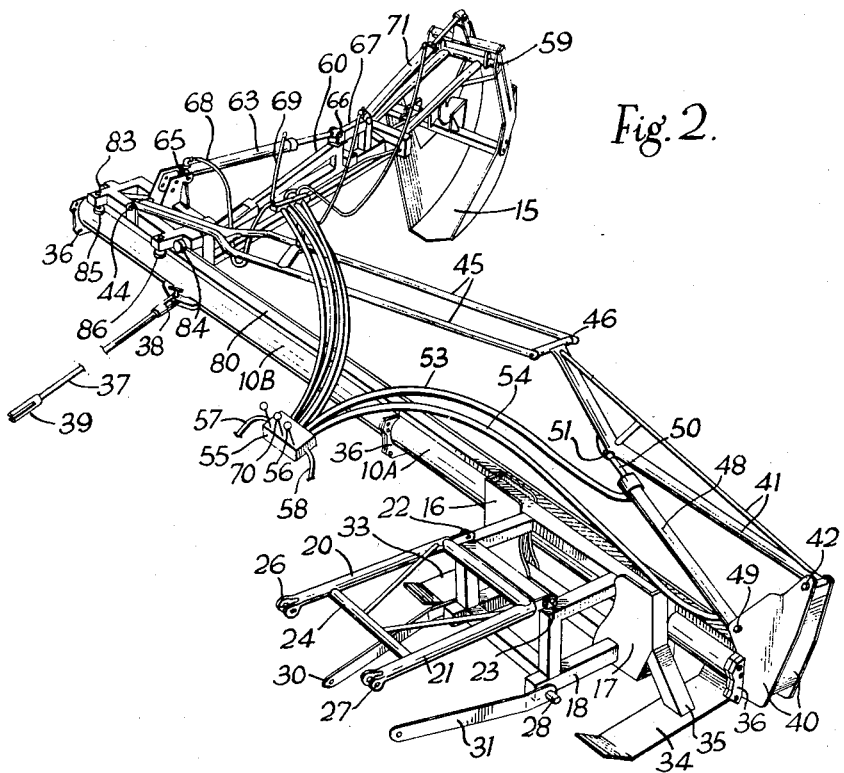
FIGURE 2 is a perspective view of said apparatus looking from the front towards the rear.

The beam shown in FIGURE 2 is made in two parts, viz. a part 10A carried by the brackets 16, 17 and an extension 10B. Both parts are provided with flanges 36 at each end whereby the extension 10B can be attached to either end of part 10A so that the tool can be made effective on either side of the machine. The extension 10B is removed when the machine is to be driven on the road. A tie-rod 37 is attached at one end 38 to the extension 10B and is connected at its other end 39 to a suitable part of the tractor.

One end of the beam carries brackets 40 on which an arm 41 (in the form of a framework) is pivoted at 42. Pivoted at 44 to the carriage 12 is a second framework arm 45. The arms 41, 45 are pivotally connected together at 46 so that they form a toggle. This toggle is operated by a double-acting hydraulic jack 48 that has its cylinder pivoted at 49 to the brackets 40 and has its ram 50 pivoted at 51 to the arm 41. Liquid can be introduced to either end of the jack and exhausted therefrom by pipes 53, 54 controlled by valve box 55 under control of a handle 56, the valve box being supplied with liquid under pressure by pipe 57 and exhausted by pipe 58.

The bucket or shovel 15 is pivotally carried at 59 by an arm 60 that is pivoted on the carriage 12. Pivotal movements of the arm 60 are effected by a double acting hydraulic jack 63 that is pivoted at 65 to the carriage and at 66 to a bracket 67 on the arm 60. The jack is connected to liquid supply and exhaust pipes 68, 69 which are connected to the valve box 55 and are controlled by valve lever 70.

Tilting movements of the shovel about the pivot 59 are effected by a double acting hydraulic jack 71 that is pivoted to the bracket 67 and linked to the shovel.

Figure 3:
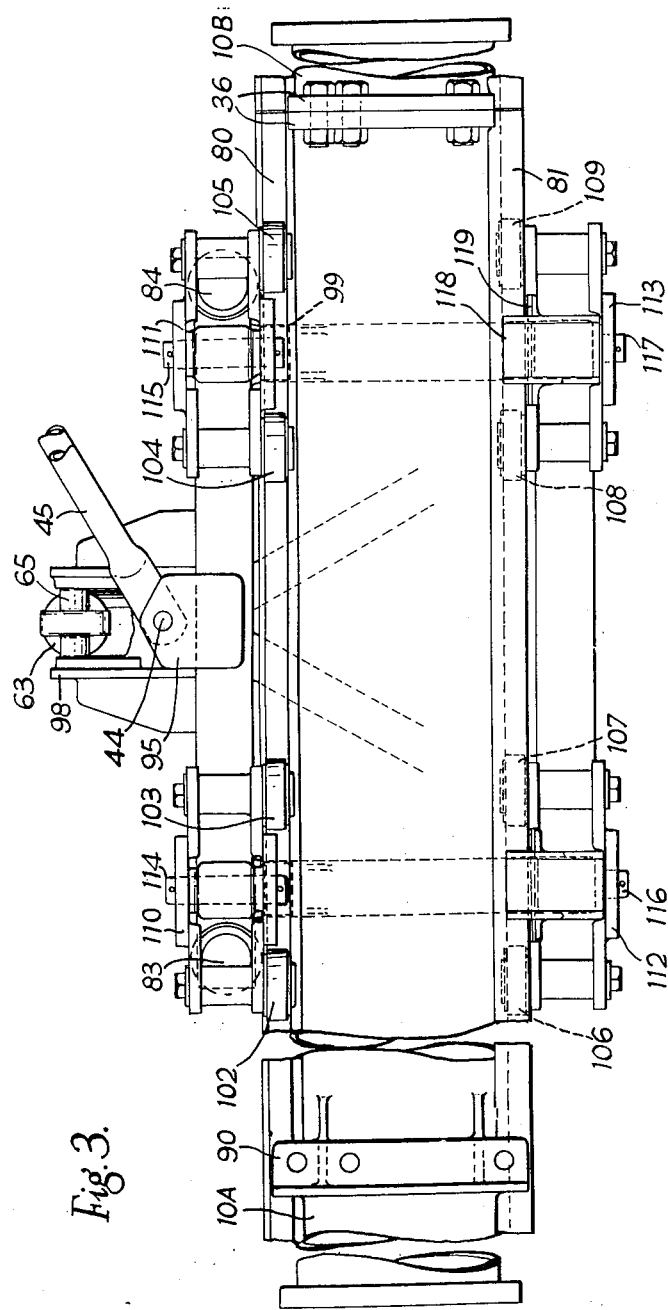
FIGURES 3, 4 and 5 are views in front elevation, plan and end elevation respectively of a modified form of beam and carriage.
Figure 4:
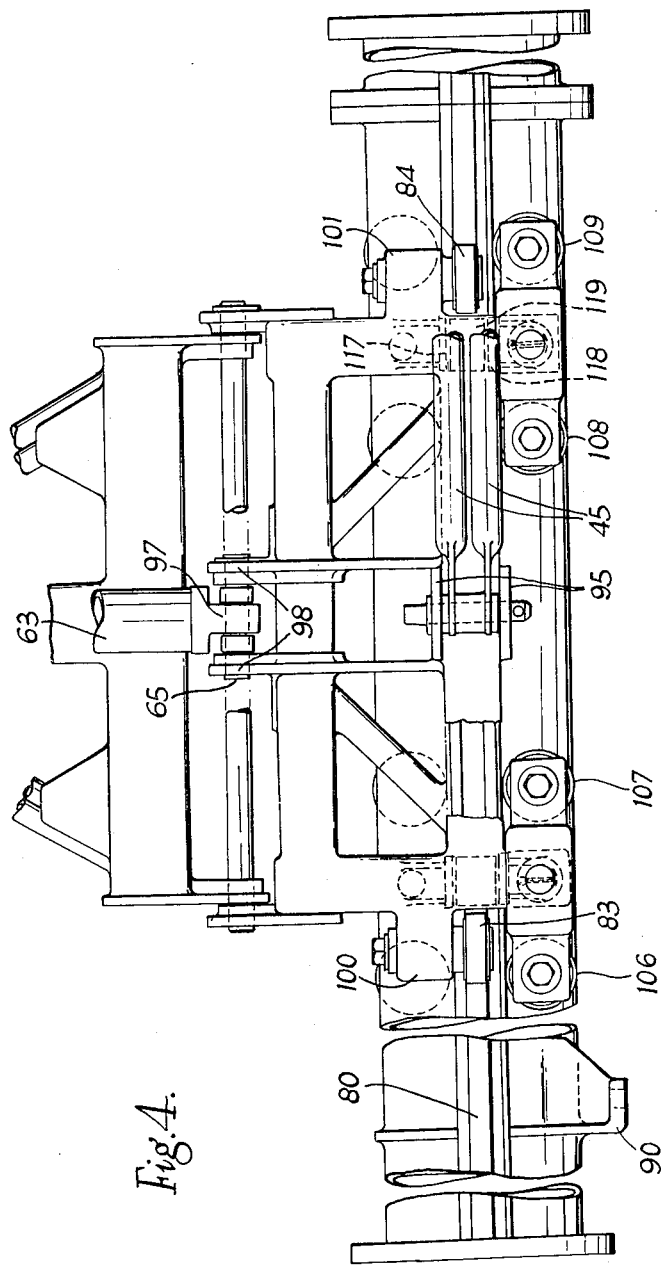
Figure 5:
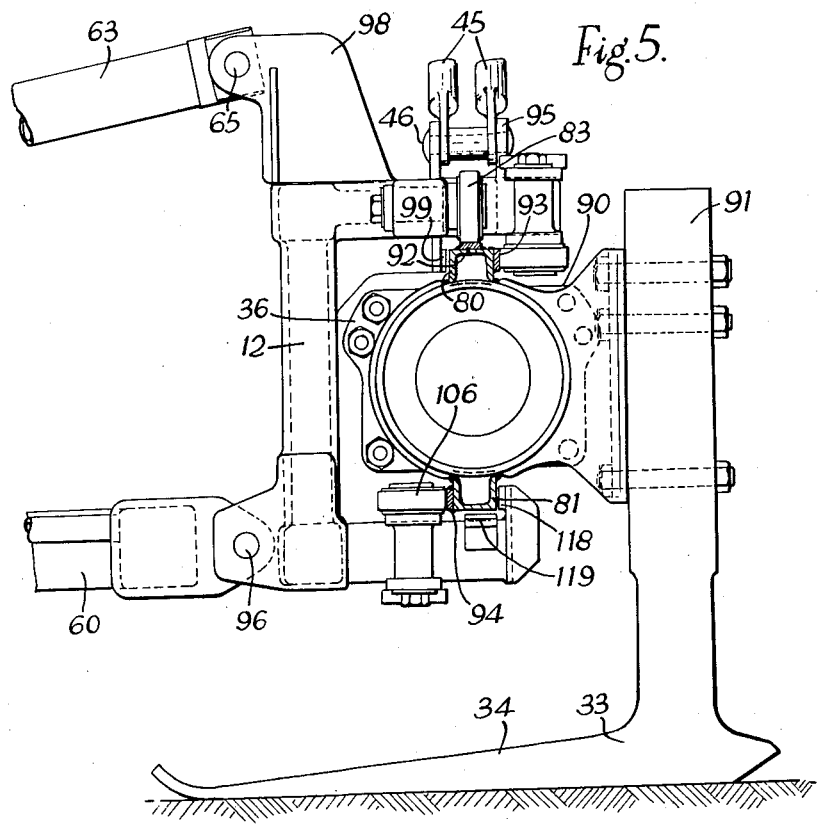

The carriage 12 shown in FIGURE 2 is guided and supported by upper and lower rails 80, 81. The lower rail 81 is not shown in FIGURE 2 but is the same as shown in FIGURES 3, 4 and 5 to be described. Each rail is in two parts carried by the beam parts 10A, 10B respectively. The rails are spaced from the frame 18 so that the carriage can run along from one end of the beam 10A, 10B to the other. The upper surface of the upper rail serves as a bearing surface to carry the load of the carriage by means of rollers 83, 84 carried by the carriage. The front surface of the rail 80 is engaged by rollers 85, 86 on the carriage and the rear surface of the rail 81 is engaged by similar rollers (as will be described with reference to FIGURES 3, 4 and 5). These rollers carry the overhung weight of the shovel.

Referring now to the modified construction shown in FIGURES 3, 4 and 5 the beam 10A, 10B is tubular and has flanges 90 carrying a frame 91 (FIGURE 5) to which the skids 33, 34 are attached. The beam parts are provided with the flanges 36. The rails 80, 81 are of channel section welded to the beam. A bearing strip 92 is welded on the upper surface of the rail 80, and a similar strip 93 welded to the front surface thereof. Another bearing strip 94 is welded to the rear surface of the rail 81. The arm 45 is pivoted at 46 to lugs 95 on the frame-like carriage 12. The boom 60 is pivoted at 96 to the carriage 12. The hydraulic jack 63 is pivoted at 65 to lugs 98 on the carriage 12.

The rollers 83, 84 are pivoted on pivots carried by extensions 100, 101 on the carriage.

Two pairs of rollers 102, 103 and 104, 105 engage the bearing strip 93. Two pairs of rollers 106, 107 and 108, 109 engage the bearing strip 94. These four pairs of rollers are carried by bogies 110, 111, 112, 113 respectively that are pivoted at 114, 115, 116 and 117 on the carriage; the axes of each of these pivots between the adjacent pair of wheels are parallel to the axes thereof so that the bogies can tilt to accommodate any slight inaccuracies in the rail. These pairs of rollers support the horizontal loads produced by the moment of the gravitation forces of the overhanging boom and shovel assembly.

The carriage carries a pair of check pads 99 to engage the rear surface of the upper rail; a pair of check pads 118 to engage the front surface of the lower rail; and a pair of check pads 119 to engage the under surface of the lower rail. Normally the rollers receive the loads but sometimes when stationary, the hydraulic jark exerts a force in the opposite direction to make the shovel exert a downward cutting pressure. When this happens the carriage rises until the pads 119 contact the rail 81. The carriage then rotates about the axis of the beam until the pads 99, 118 contact the rails. In this condition the rollers are all clear of the rails.

FIGURES 6 and 7 show details of the shovel carrying boom 60. This boom has a main tubular part 120 which is pivotally mounted at 126 on the carriage 12 and receievs a boom extension 121 telescopically slidable therein and carried by rollers which are mounted on pins 122, 123, 124, 125. The shovel 15 has two fixed brackets 128, 129 which are pivotally mounted on a pivot spindle 127 carried by the outer end of the extension 121. The bracket 128 carries an anti-friction roller 130 and the bracket 129 carries a pawl 131 pivoted thereon by pin 132.

The boom includes the bracket 67 fixed on the part 120 and this framework carries pivot pins 135, 65 to which the jacks 71, 63 respectively are pivotally attached. The rear end of the jack 71 is pivoted by pin 140 to the forward end of a link or rocking member which comprises an end member 141, cross-member 142, two side bars 143, 144, and two downwardly extending limbs 145, 146. The bars carry lugs 147, 148 and these lugs are pivotally mounted on a pin 150 on which the whole link pivots. The limbs 145, 146 are pivotally attached at 151, 152 to the shovel. The pin 150 is carried by one end of a link 154, the other end of which is pivotally mounted on a pin 155 carried by the boom member 120.

The pawl 131 normally engages a pin 160 carried by the bars 143, 144 and thereby holds the bucket or shovel 15 fixed in relation to the boom extension 121 and to the link 141—146. The pawl has a tail 161 which can ride up a cam surface 162 for releasing the pawl from the pin. The pin 122 also carries a pawl 163 engageable with pin 160 and this pawl also has a tail 164 which can ride up on the roller 130 for disengagement.

The operation is as follows:

The carriage 12 is traversed along the rails by operating the jack 48 to bring the shovel 15 into the required lateral digging position. The jack 71 is operated to extend the boom, and the jack 63 is then operated to swing the boom downwards around its pivot to bring the digging edge of the bucket against the soil to be dug.

Then the jack 71 is extended and this pulls the boom member 121 into the tube member 120 and at the same time the bucket moves along approximately parallel with bottom of trench to scoop up the earth. Towards the end of this movement the pawl 131 is released from the pin 160 and the pawl 163 engages the pin 160, thereby locking the extension 121 within boom 120. The jack 71 is still allowed to continue its extending movement which causes the bucket to pivot about its axis 127, thus completing the working of the shovel by an arcuate movement. The jack 63 is now operated to raise the boom and shovel and the jack 48 is actuated to traverse them to required lateral position along the beam 10A, 10B.

The jack 71 is now operated in reverse and in consequence of the extension 121 being locked to boom 120, the link 141—146 causes the bucket to swing rearwardly and upwardly about its axis on the pivot spindle 127, thereby emptying itself. At the end of this emptying movement the roller 130 engages the tail 164 and releases pawl 163 from pin 160. This allows part 121 to become re-extended and pawl 131 to re-engage pin 160 in readiness for a further digging operation.

If the beam part 10B is removed and attached to the opposite end of the beam part 10A, it is also necessary to reverse the positions of the parts 40 to 46 with the parts carried thereby.

If desired, the beam 10A, 10B need not be attached to the lifting elements of the tractor but may be fixed to the tractor, means being provided for effecting vertical adjustment of the skids 33, 34.

The beam 10A, 10B could be made permanently extending on both sides of the tractor if required.

Figure 8:
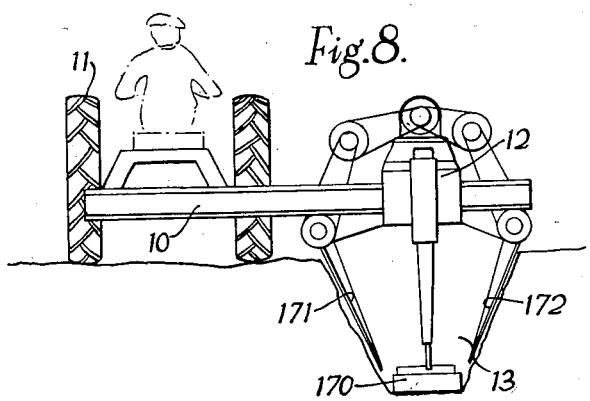
FIGURE 8 shows a rear view of the tractor carrying an alternative form of tool.

FIGURE 8 shows a different tool mounted on the carriage and comprising a rotary cutter 170 for cleaning the bottom of a ditch and two side cutters 171, 172 which serve to clean the sides of the ditch.

We claim:

1. Apparatus to be used on a tractor for supporting an agircultural tool comprising a beam, means carried by the beam for attaching the same to and for support by the tractor transversely across the tractor, whereby said beam can extend to a position at one side of the tractor, a carriage mounted on and for relative movement along the beam, means on said carriage for the detachable attachment and support of the tool, and means for moving the carriage longitudinally along the beam; an upper rail and a lower rail carried by said beam each said rail providing a forward bearing face and a rearward bearing face; an upper bearing face on the upper rail; and a lower bearing face on the lower rail; wheels carried by said carriage engaging said upper bearing face, rear face of the upper rail and front face of the lower rail; and means carried by said carriage engageable with the front face of the upper rail, rear face of the lower rail, and lower face of the lower rail, and means for moving the carriage slidably along said beam.

2. Apparatus as claimed in claim 1 wherein the wheels engaging the upper rear face and the wheels engaging the lower front face consist of two pairs of wheels, each pair carried by a bogey pivoted on the carriage on an axis disposed between the wheels parallel to the axes thereof.

3. Apparatus to be used on a tractor to support an agricultural tool comprising a first beam member, means carried by the beam member for attaching the same to and for support by the tractor transversely across the tractor, flanges fixed one at each end of the beam member, a second beam member having flanges fixed one at each end thereof for connection to the flanges of the first beam member whereby the second beam member can be fixed to either end of the first beam member, bearing surfaces on both beam members which are continuous over both beam members in either position of the second beam member, a carriage slidably mounted on said bearing surfaces, an arm pivoted to the carriage and carrying said tool, and means for moving the carriage along the bearing surfaces.

4. Apparatus to be used on a tractor for supporting an agricultural tool comprising a beam means carried by the beam for attaching the same to and for support by the tractor transversely across the tractor, bearing surfaces along said beam, a carriage mounted slidably on said surfaces, a tool carrying arm mounted pivotally on said carriage, a toggle having one end pivoted to the carriage and the other end pivoted to the beam for moving the carriage along the beam, a first hydraulic jack pivoted at one end to the toggle and at the other end to the beam for operating the toggle, and a second hydraulic jack pivoted at one end to the carriage and at the other end to the tool carrying arm for lifting and lowering the latter about its pivotal axis.

References Cited in the file of this patent

UNITED STATES PATENTS

| 1,841,032 | Hutchinson | Jan. 12, 1932 |
| 2,880,040 | Gomersall | Mar. 31, 1959 |

FOREIGN PATENTS

| 5,369 | Australia | Dec. 14, 1932 |
| 115,916 | Australia | Sept. 22, 1942 |
| 745,690 | Great Britain | Feb. 29, 1956 |
| 780,325 | Great Britain | July 31, 1957 |